United States Patent
Everett

(10) Patent No.: US 7,748,421 B2
(45) Date of Patent: Jul. 6, 2010

(54) PORTABLE APPARATUS FOR REDUCING VEGETATION AND METHOD FOR USING SAME

(76) Inventor: Darrell Everett, 3665 Old Dalton Rd., NE., Rome, GA (US) 30165

( * ) Notice: Subject to any disclaimer, the term of this patent is extended or adjusted under 35 U.S.C. 154(b) by 1225 days.

(21) Appl. No.: 11/312,249

(22) Filed: Dec. 19, 2005

(65) Prior Publication Data
US 2006/0156704 A1   Jul. 20, 2006

Related U.S. Application Data

(60) Provisional application No. 60/637,016, filed on Dec. 17, 2004.

(51) Int. Cl.
*A01G 23/06* (2006.01)
(52) U.S. Cl. .................. 144/172; 144/174; 144/24.12; 241/101.71
(58) Field of Classification Search .............. 144/162.1, 144/172, 174, 24.12; 241/101.71, 101.72, 241/101.74, 292.1, 277
See application file for complete search history.

(56) References Cited

U.S. PATENT DOCUMENTS

| | | | | |
|---|---|---|---|---|
| 4,848,423 A * | 7/1989 | Yoder | ....................... | 144/24.12 |
| 5,005,620 A * | 4/1991 | Morey | ....................... | 144/373 |
| 5,158,126 A | 10/1992 | Lang | | |
| 5,193,597 A * | 3/1993 | Strong | ....................... | 144/208.7 |
| 5,203,388 A | 4/1993 | Bowling | | |
| 5,259,692 A * | 11/1993 | Beller et al. | ................... | 404/90 |
| 5,355,918 A | 10/1994 | Lang | | |
| 5,419,380 A * | 5/1995 | Bot | ............................ | 144/334 |
| 5,499,771 A | 3/1996 | Esposito et al. | | |
| 5,555,652 A | 9/1996 | Ashby | | |
| 5,641,129 A | 6/1997 | Esposito et al. | | |
| 5,692,689 A | 12/1997 | Shinn | | |
| 5,743,314 A | 4/1998 | Puch | | |
| 5,743,315 A | 4/1998 | Esposito et al. | | |
| 5,794,673 A | 8/1998 | Milbourn et al. | | |
| 5,794,866 A | 8/1998 | Shinn | | |
| 5,829,497 A | 11/1998 | Maroney | | |
| 5,975,644 A | 11/1999 | Lang | | |
| 6,047,749 A | 4/2000 | Lamb | | |
| 6,230,770 B1 | 5/2001 | Spaargaren | | |
| 6,263,930 B1 | 7/2001 | Wiley | | |
| 6,435,234 B1 | 8/2002 | Paumier | | |
| 6,438,874 B1 | 8/2002 | LaBounty et al. | | |
| 6,659,378 B2 * | 12/2003 | Di Anna | ....................... | 241/73 |
| 6,668,880 B2 | 12/2003 | Nordstrom | | |
| 6,681,818 B2 | 1/2004 | Kurelek | | |
| 6,824,089 B2 * | 11/2004 | Gross et al. | ............... | 241/261.1 |
| 6,848,244 B2 * | 2/2005 | Northcutt | .................... | 56/249.5 |

* cited by examiner

*Primary Examiner*—Shelley Self
(74) *Attorney, Agent, or Firm*—Alston & Bird, LLP

(57) ABSTRACT

The concept of using a cutting element proximate the end of an excavator or similar device, along with the concept of using a cogged belt pulley configuration, an overhead load adaptor, a single- or multiple-pivoting drum configuration, and other concepts disclosed herein. The present invention also provides an improvement of the prior art by providing a chipping action, which is according to the present invention an improvement over prior art shredding configurations.

9 Claims, 14 Drawing Sheets

Figure 1:
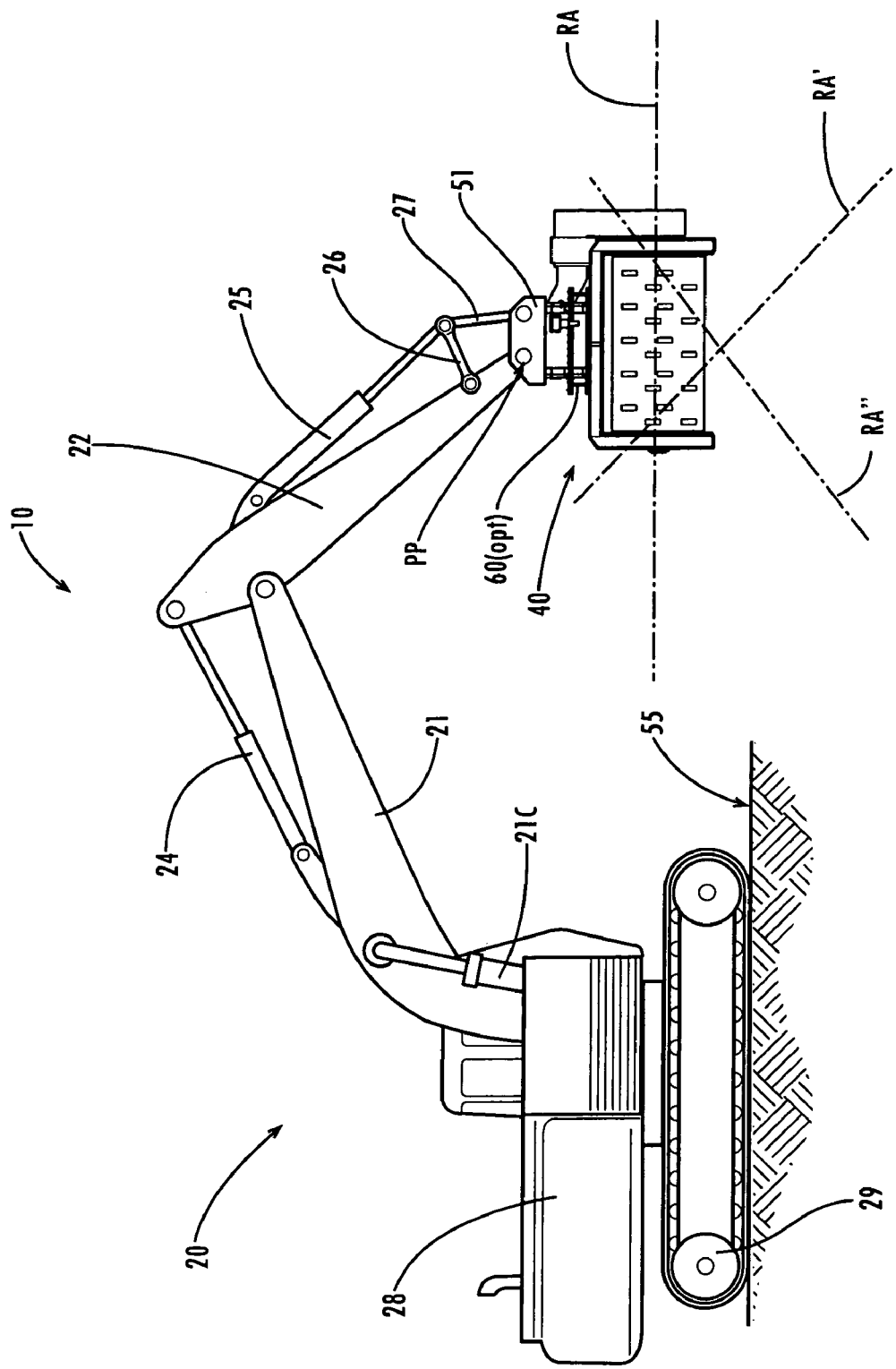

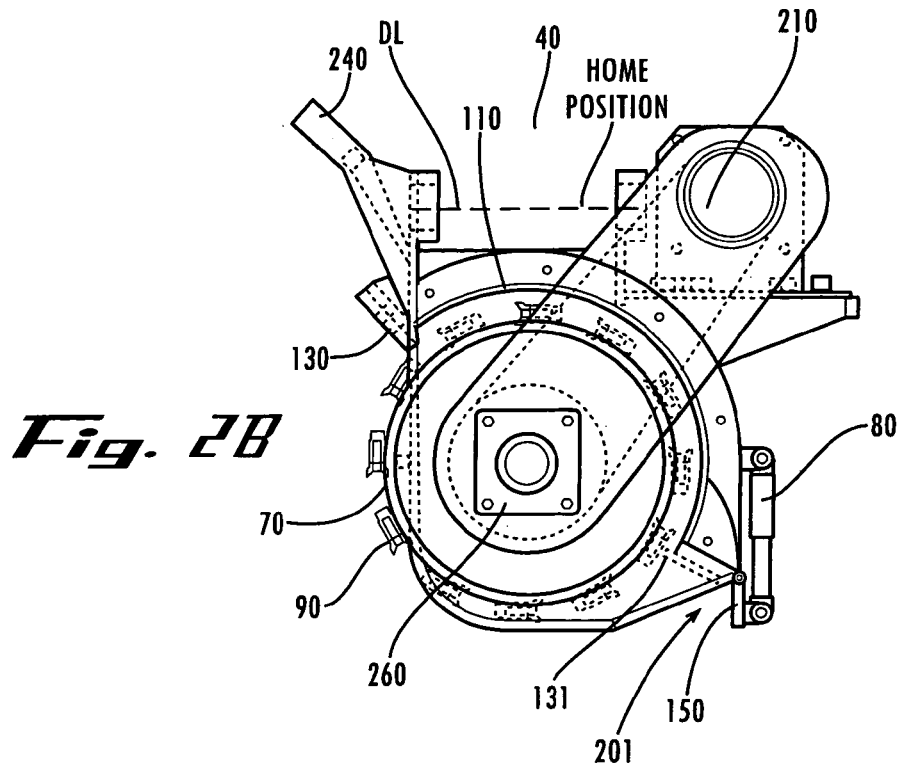
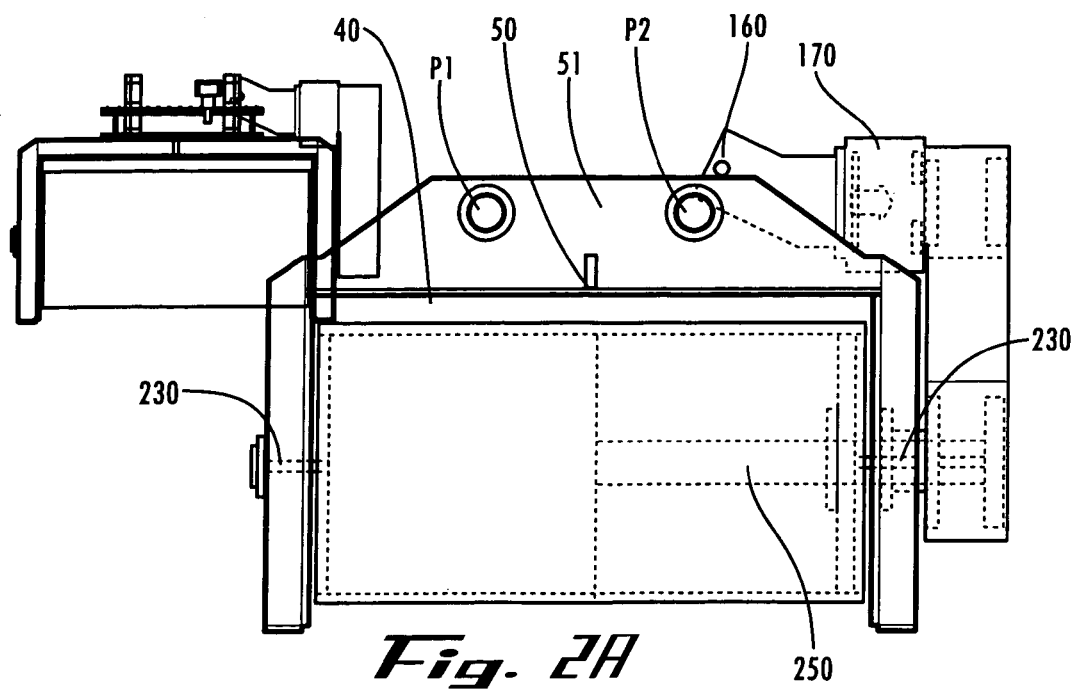

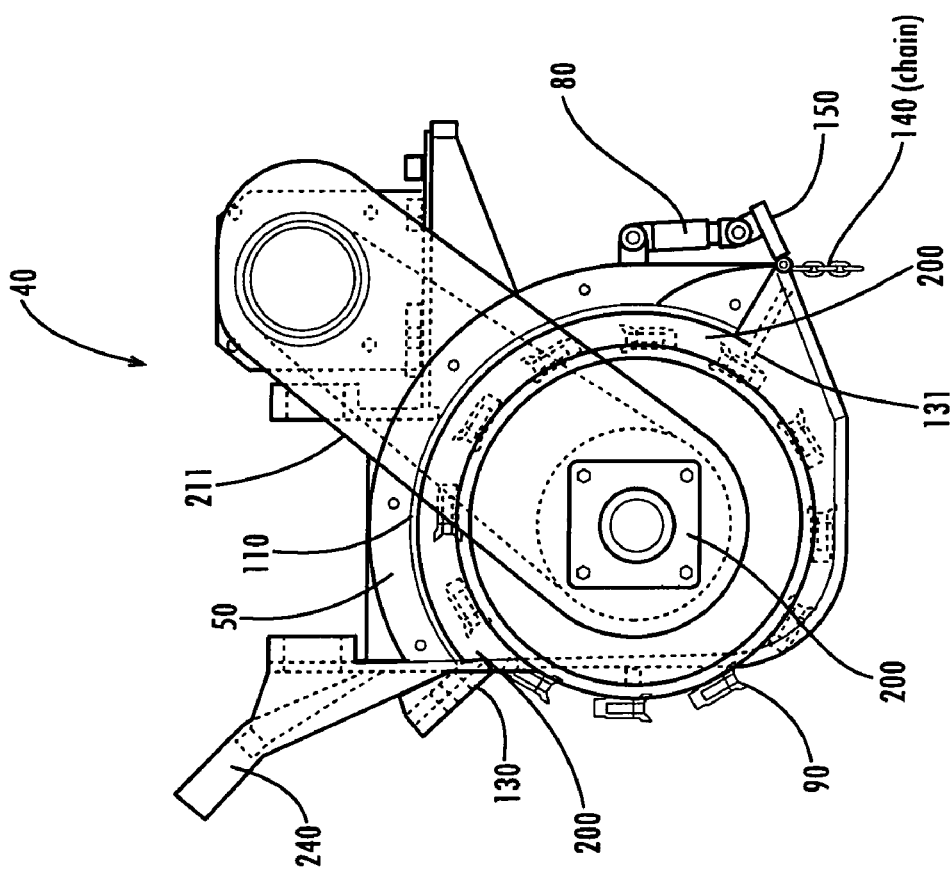
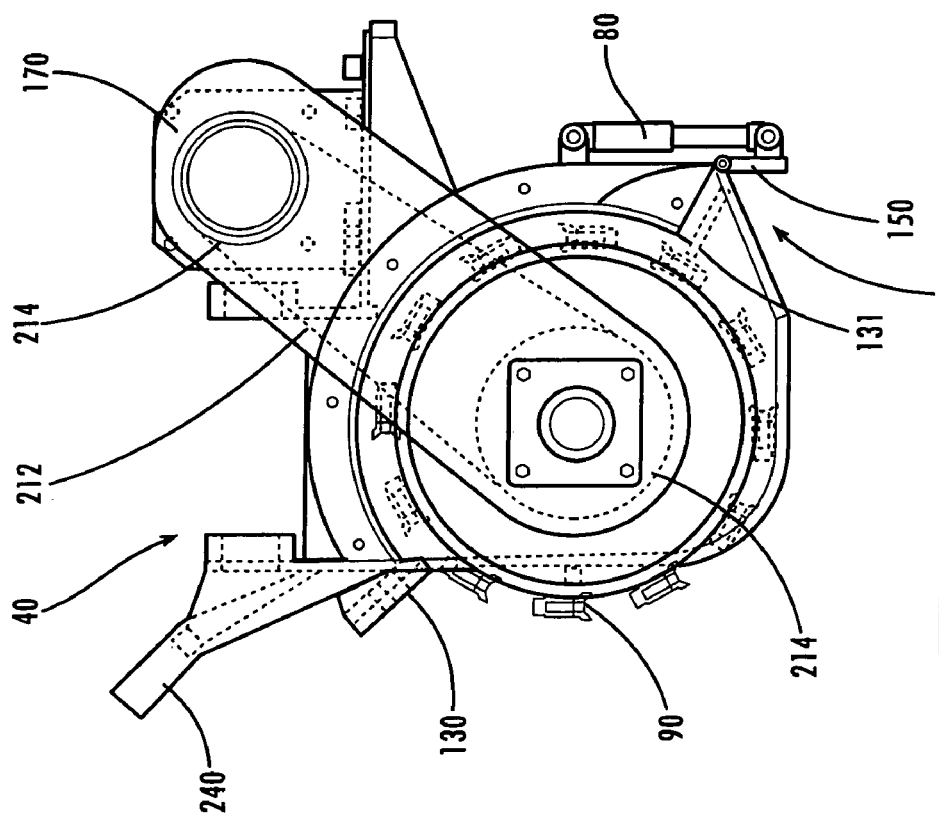

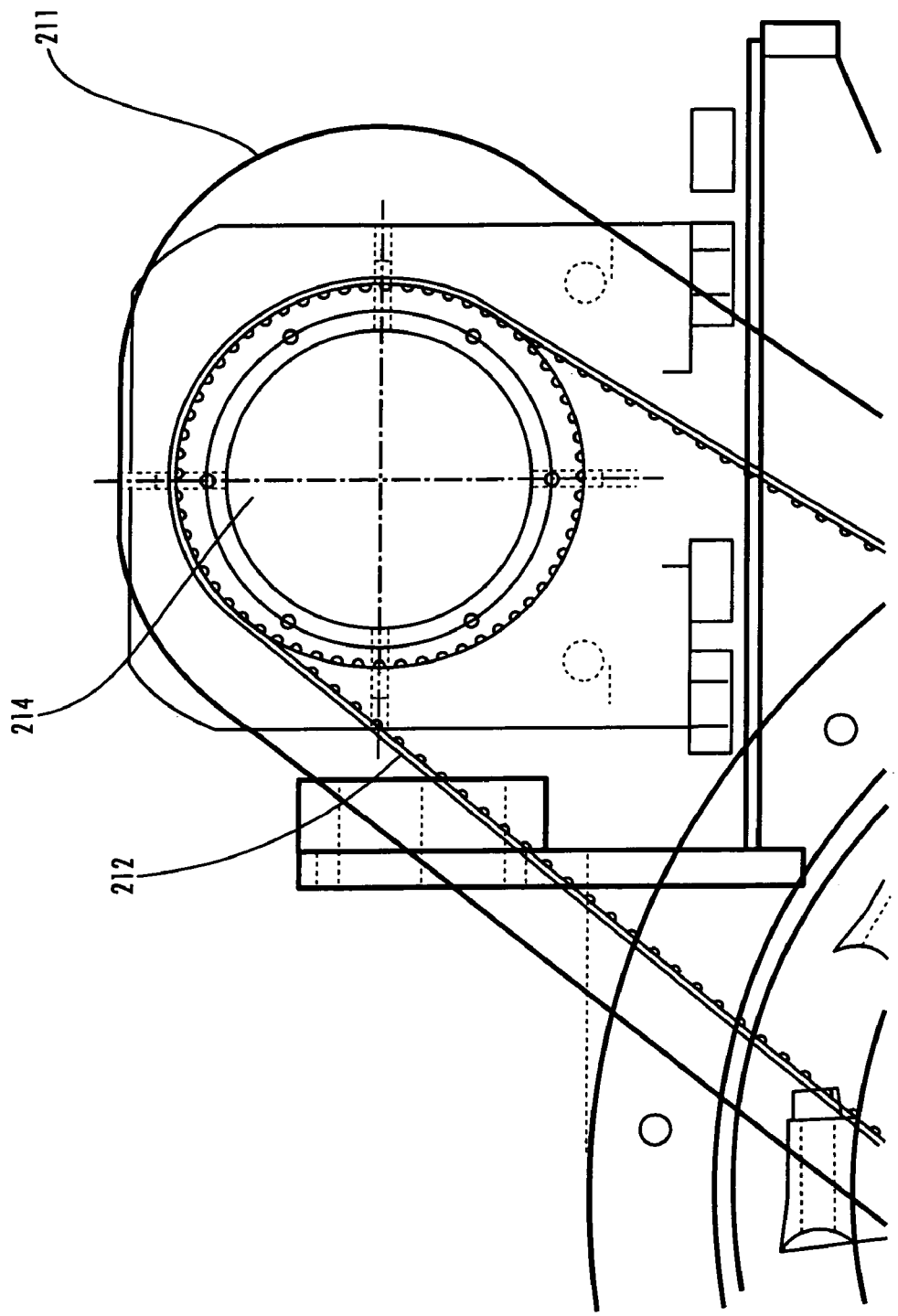

40

PORTABLE APPARATUS FOR REDUCING VEGETATION AND METHOD FOR USING SAME

CROSS REFERENCE TO RELATED APPLICATION

The present application claims the full benefit and priority of U.S. patent provisional application Ser. No. 60/637,016, filed Dec. 17, 2004, and incorporates the entirety of said application by reference. The present application is being filed on the Monday following Dec. 17, 2005, which fell on a Saturday.

BACKGROUND OF THE INVENTION

The present invention generally relates to an improved device and method of using same which provides a reduction in size of wood or other elements, and particularly relates to the reduction of brush, trees and all types of vegetation into smaller elements sometimes referenced as "chips".

Various mechanisms are present in the art for providing the reduction in size of brush, trees and all types of vegetation by the use of rotating drums at the end of the articulating arm of a device often referenced as an excavator.

However, these devices include disadvantages. Many of the known prior art configurations do not have a reliable drive system that will withstand the day in and day out working cycle that the machines must go through. Other machines on the market tend to shred the materials that they are grinding.

Therefore it may be seen that there is a need in the art for an improved method and apparatus for provides a reduction in size of wood or other elements, particularly as this relates to the reduction of brush, trees, and the like on construction or clean-up sites.

BRIEF SUMMARY OF THE INVENTION

Generally described, the present invention relates to a reducing apparatus (and method of using same) which includes cutting elements for grinding brush, trees and all types of vegetation at work sites which require that said vegetation be reduced or "ground" into smaller elements in order to be more easily managed during removal by transport, or in order to be used as mulch or the like on work site. Such work sites may include construction site, water line sites, sewer line sites, disaster sites, and many more.

The reducing apparatus invention is used in connection with a self-propelled vehicle, such as an excavator or large rubber tire carrier. This combination results in another overall "wood reducing vehicle" invention. This wood reducing vehicle is particularly applicable for clearing large areas of land. Particularly, the wood reducing vehicle is idea for clearing brush, trees, stumps and other vegetation in a safe, quick and economically means while being environmentally friendly to the landscape.

While clearing vegetation such as trees and brush, said invention grinds and chips said materials into fine mulch and chips to leave onsite as an erosion control ground cover thereby reducing the need for further erosion control methods at this time.

Therefore, it is an object of the present invention to provide an improved apparatus and method of using same for reducing the size of objects.

It is a further object of the present invention to provide an improved apparatus and method of using same for reducing the size of wood objects.

It is a further object of the present invention to provide an improved apparatus and method of using same for reducing brush, trees, stumps and other vegetation into more manageable "mulch" or "chips".

It is a further object of the present invention to provide an improved apparatus and method of using same for reducing brush, trees, stumps and other vegetation which is simple to use.

It is a further object of the present invention to provide an improved apparatus and method of using same for reducing brush, trees, stumps and other vegetation which is economical to use.

It is a further object of the present invention to provide an improved apparatus and method of using same for reducing brush, trees, stumps and other vegetation which is economical to manufacture.

It is a further object of the present invention to provide an improved apparatus and method of using same for reducing brush, trees, stumps and other vegetation which is efficient.

It is a further object of the present invention to provide an improved apparatus and method of using same for reducing brush, trees, stumps and other vegetation which can adapt to different environments.

It is a further object of the present invention to provide an improved apparatus and method of using same for reducing brush, trees, stumps and other vegetation which can provide a reduced danger of injury to the operator and to bystanders.

It is a further object of the present invention to provide an improved apparatus and method of using same for reducing brush, trees, stumps and other vegetation which is self propelled.

It is a further object of the present invention to provide an improved apparatus and method of using same for reducing brush, trees, stumps and other vegetation which provides a relatively small chip that can be used for mulch; corrosion control and landscaping.

It is a further object of the present invention to provide an improved apparatus and method of using same for reducing brush, trees, stumps and other vegetation which can reach areas on a site that other self propel machines cannot access or reach.

These and other objects of the present invention are achieved in the preferred embodiments disclosed below by providing an improved grinding and cutting device for being attached to an end of a movable working arm of a self-propelled machine. This facilitates clearing, grinding and chipping brush, trees and vegetation in an improved manner.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an overall view of the overall reducing apparatus 10 which includes an excavator and a reducing apparatus 40. The excavator 20 includes a first supporting arm 21, a second supporting arm 22, a first hydraulic cylinder 24, a second hydraulic cylinder 25, a pivot link 26, and a floating link 27. The second supporting arm 22 and the floating link 27 attach at two separate locations and support the reducing apparatus 40.

FIG. 2A is a front view and FIG. 2B is an end view of the reducing apparatus 40 according to the present invention. Also shown are the frame assembly 50, the reducing apparatus cylinder 70 (a.k.a. drum 70), the cutting elements 90, the hydraulic motor 160, the overhung load adaptor 170, the wire cutter knives 230, the drum shaft 250, a bearing 260, the first and second anvil plates 130, 131, the trap door 150 (shown in its "down position"), the reducing apparatus cylinder 70, and the cogged belt power train assembly 210. Dotted line DL illustrates the axis of a connecting pin (not shown) which is used to connect the apparatus 40 to the excavator. Location points P1 and P2 designate locations where the arms 22, 27, respectively, of the excavator attach to the mounting flange assembly 51 of the reducing apparatus 40 as discussed in later detail. Also shown in 2B is a second mulching zone 201, described in further detail later, which is created when the trap door 150, which is hingedly mounted to the frame of the apparatus 40, is in its down position.

FIGS. 3A and 3B are the same end view of the reducing apparatus 10 according to the present invention, with different numerals designating different elements in the two drawings. In FIG. 3A the trap door 150 is in its down position; in FIG. 3B the trap door 150 is in its up position. This up and down position is controlled by use of the double-action hydraulic cylinder 80 as discussed in further detail.

FIG. 3A identifies the cogged belt 212, the two cogged belt pulleys 214, the overhung load adaptor 170, the reducing apparatus cylinder 70, the trap door 150 (shown in a "down" position), first and second anvil plates 130, 131, and one of the cutting elements 90, and the biasing bracketry 240.

FIG. 3B identifies the containment surface 110, the cogged belt and pulley cover 211, the reducing apparatus cylinder 70, the trap door 150 (shown in an "up" position), the first mulch zone 200, which is defined between the drum and the containment surface 110 defined by the frame of the apparatus 40, a bearing 260, and one of the cutting elements 90. Also identified is the biasing bracketry 240.

Figure 4:
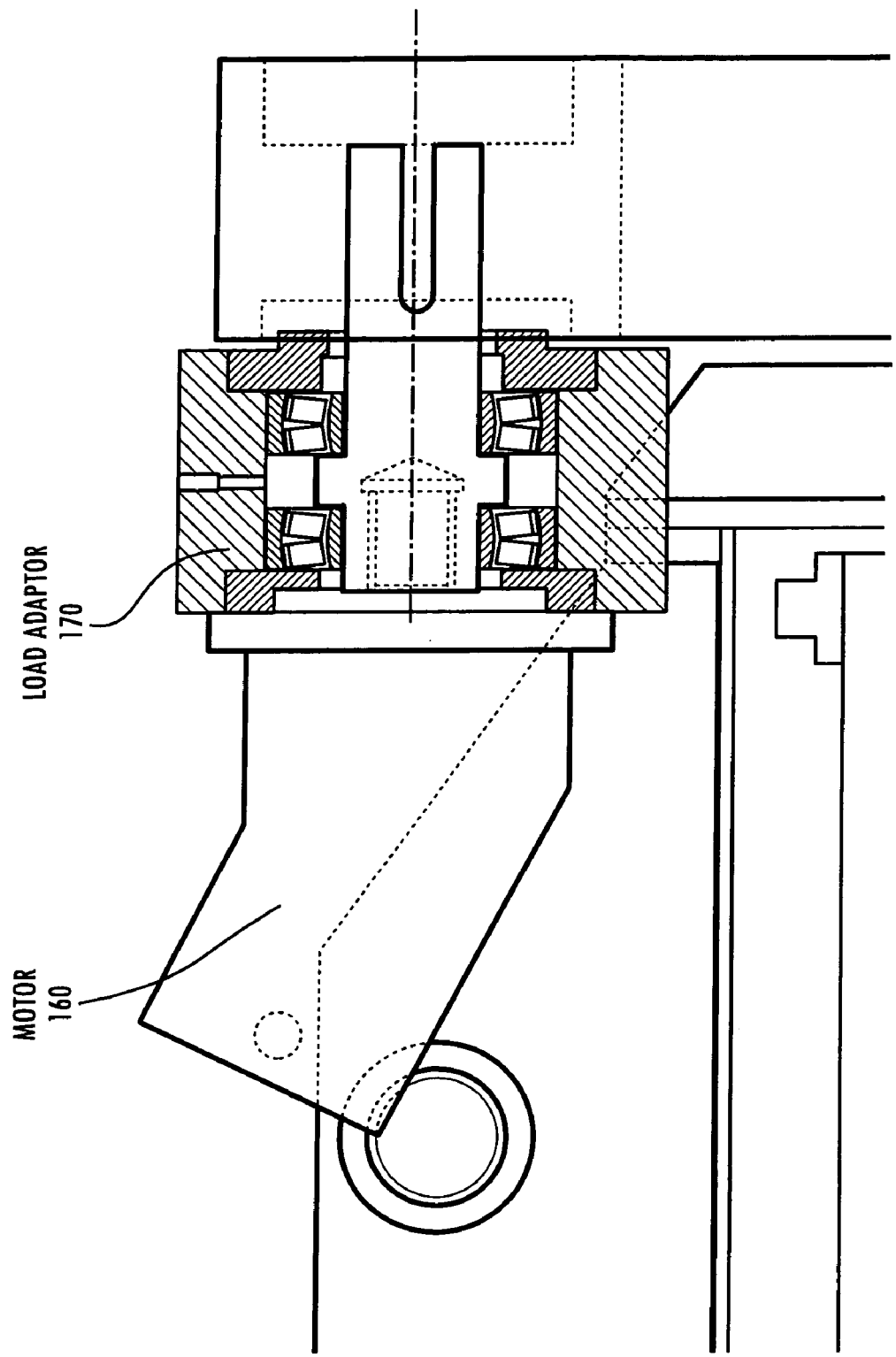

FIG. 4 is an isolated view of the hydraulic motor 160 and the overhung load adaptor 170. The overhung load adaptor 170 is such as that known in the art, and is rigidly attached to the frame of the apparatus 40. The overhung load adaptor 170 includes a rotating shaft supported by bearings, with one end of the shaft attached to the motor and driven in rotation thereby, and the other end of the shaft of the load adaptor attached to and rotatably driving one pulley of the cogged belt power train assembly.

Figure 5:
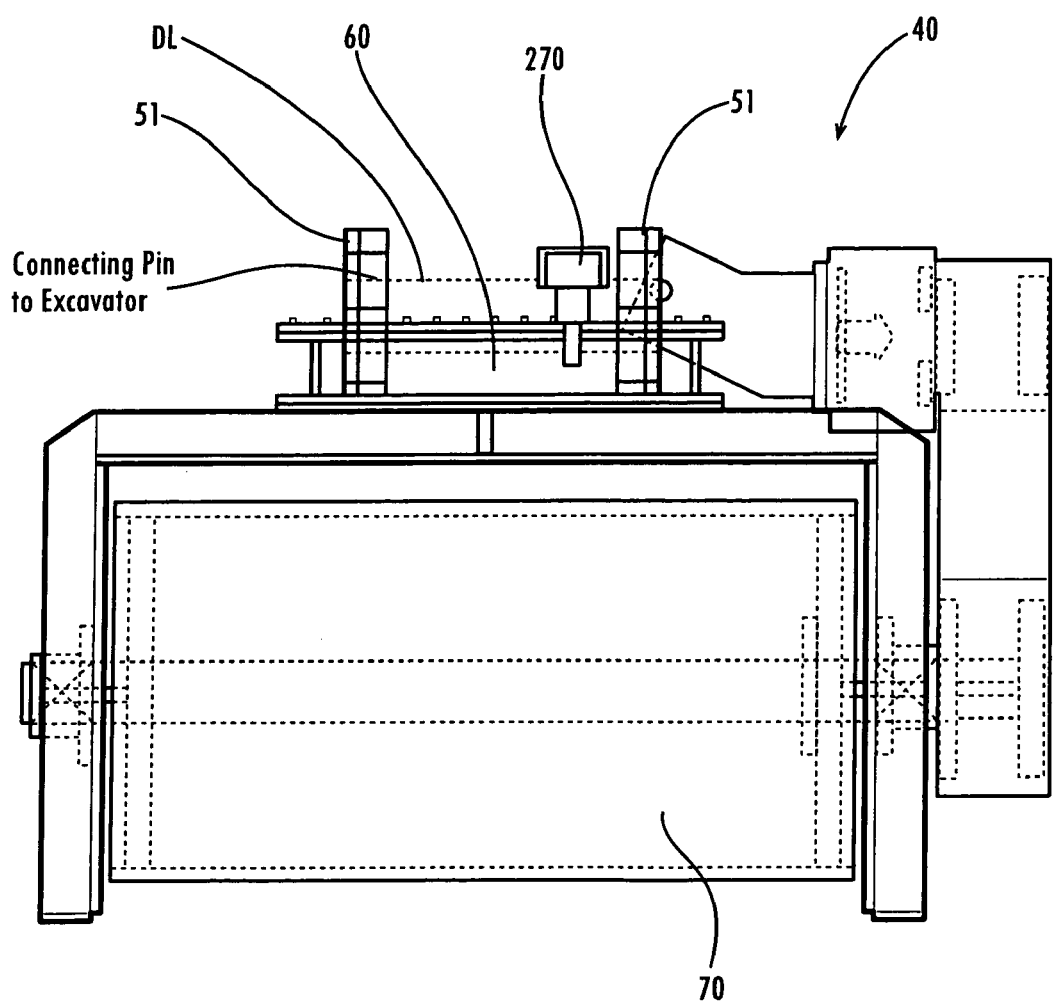
Figure 1:
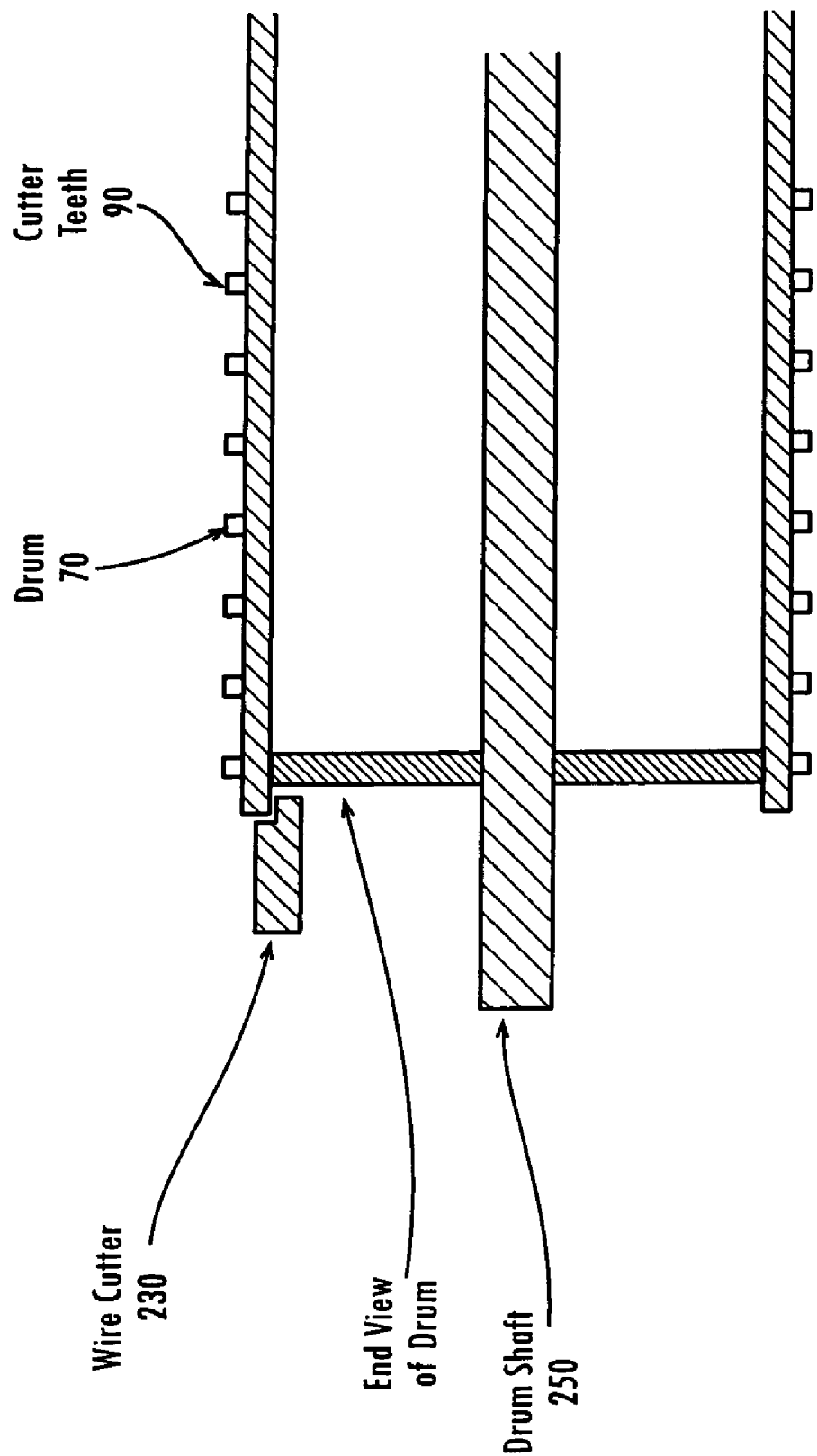

FIG. 5 is a front view of a second embodiment of the present invention, which includes a pivoting connection 60 provided by a 90 degree turntable 98. As in the first embodiment, a mounting flange assembly 51 is used to attach to the arm 22 and the floating link 27 (not shown in this figure) via the use of two parallel pins, one of which would have its longitudinal axis along dotted line DL. As discussed in detail later, the pivoting connection 60 (essentially a turntable) allows for ninety degree rotation of the reducing apparatus 40 relative to the connecting pins that attach the apparatus 40 relative to the excavator arm. Element 270 is a hydraulically driven pinion gear that drives a ring gear that is attached to the turntable. This allows for the apparatus 40 to be pivoted in two directions within a 90 degree range. It should be understood that under one embodiment of the invention the rotation of the turntable is limited to approximately ninety (90) degrees.

FIG. 6 is a partial view of that shown in FIGS. 3A (and 3B), particularly showing the cogged belt 212, a cog belt pulley 214, and the cover 211, which covers these elements.

FIG. 7 illustrates an illustrative cutaway portion of the drum 70 having cutter teeth 90 thereon, and supported by a drum shaft 250. As may be seen, the circumferential portion of the drum overhangs somewhat from the substantially round end plate, and wire cutters 230 (only one is shown in the Figure but another is contemplated for use on the opposing side of the drum).

Figure 8:
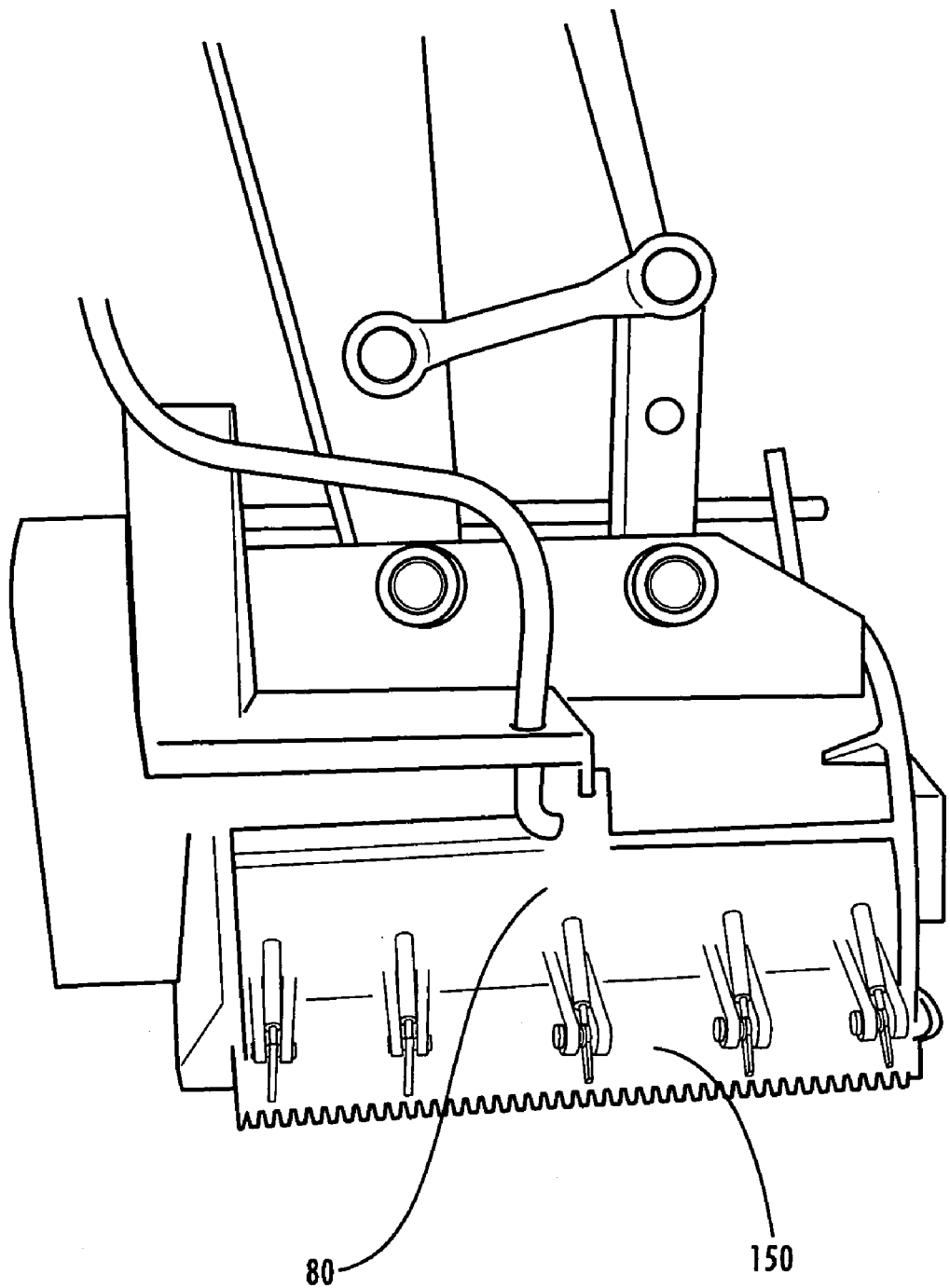

FIG. 8 is another view of the apparatus, with the individual pointing a stick at the hydraulic cylinder 80, which in one embodiment is a double acting hydraulic cylinder, which operates a pivoting trap door 150, which is shown in a down position in this figure. In this embodiment, five pivot mechanisms are shown which provide a pivoting connection for the pivoting trap door. In this view, the rotational axis of the drum 70 is substantially perpendicular to the view of the reader.

Figure 9:
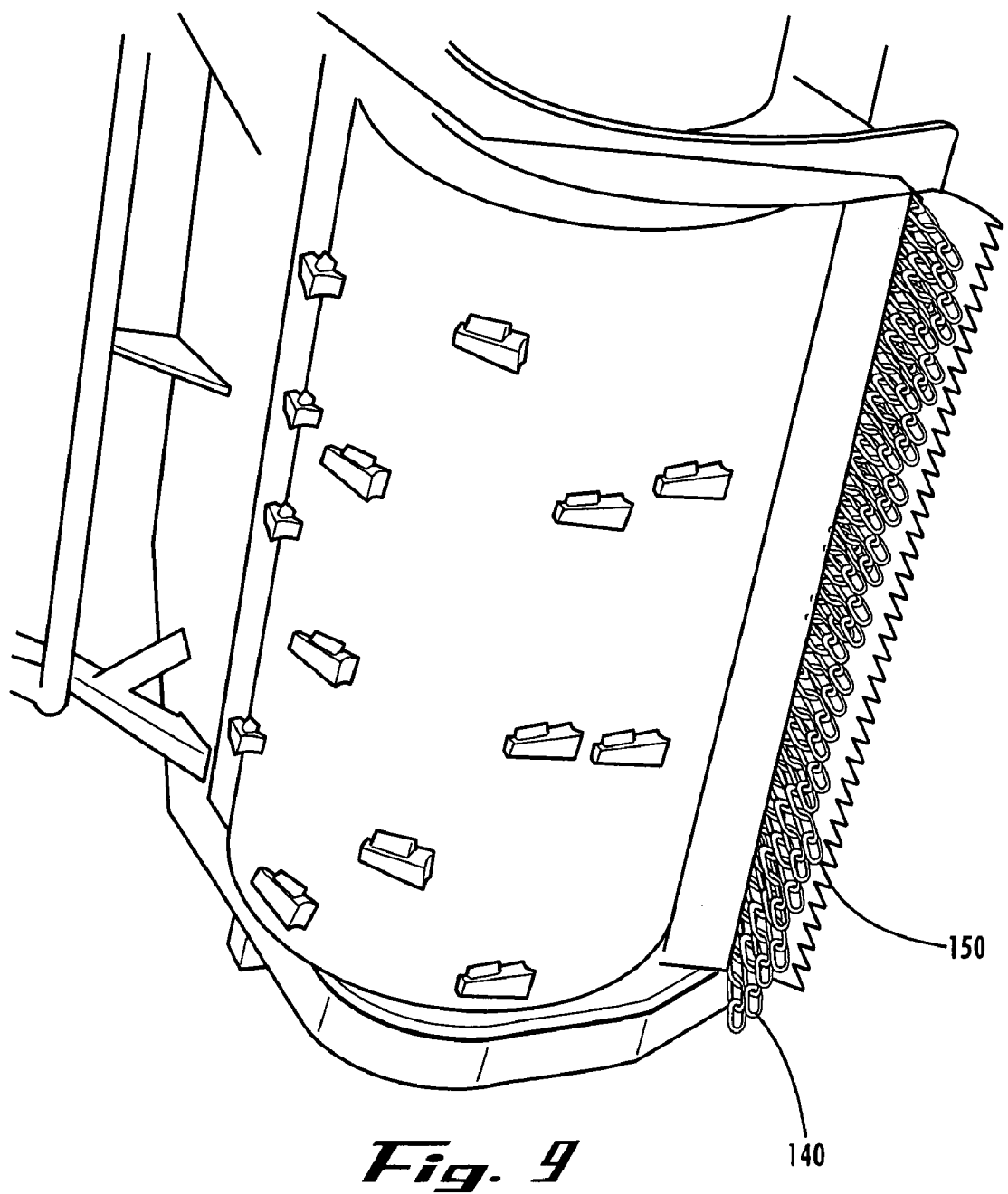

FIG. 9 is a showing an individual placing his right hand atop a chain guard assembly 140 which is positioned generally between the trap door 150 and the drum 70. The chain guard assembly hangs down and is configured to reduce deflected material, but is independent of the trap door 150. This view shows the drum axis in an inclined position to show the underside of the reducing apparatus to show the drum. Note also the bracketry shown.

Figure 10:
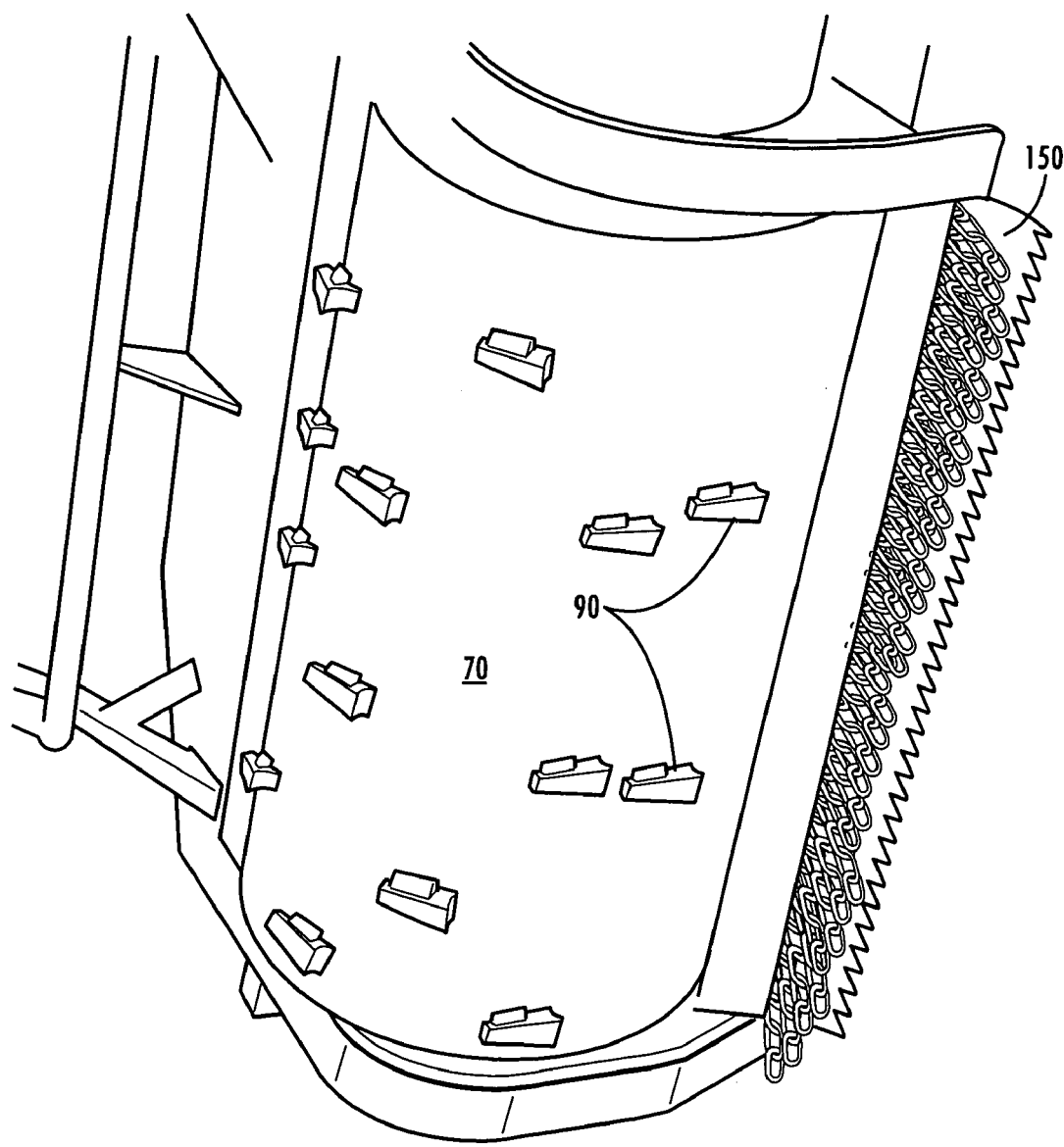

FIG. 10 is a view of the reducing apparatus 40, with the drum of the reducing apparatus rotating (note the blurred view of the cutting members). It may be seen that the longitudinal, rotational, axis of the drum has been tilted in a generally clockwise direction. This pivoting, shown generally at "P" is proximate the end of the first supporting arm 22. The axis of the pivoting is substantially along the line of sight of the viewer of the picture; this is the only pivoting which is done between the reducing apparatus and the supporting arm 22 in the first embodiment. It may also be understood that in this configuration the drum is substantially horizontal and parallel to the ground surface.

Figure 11:
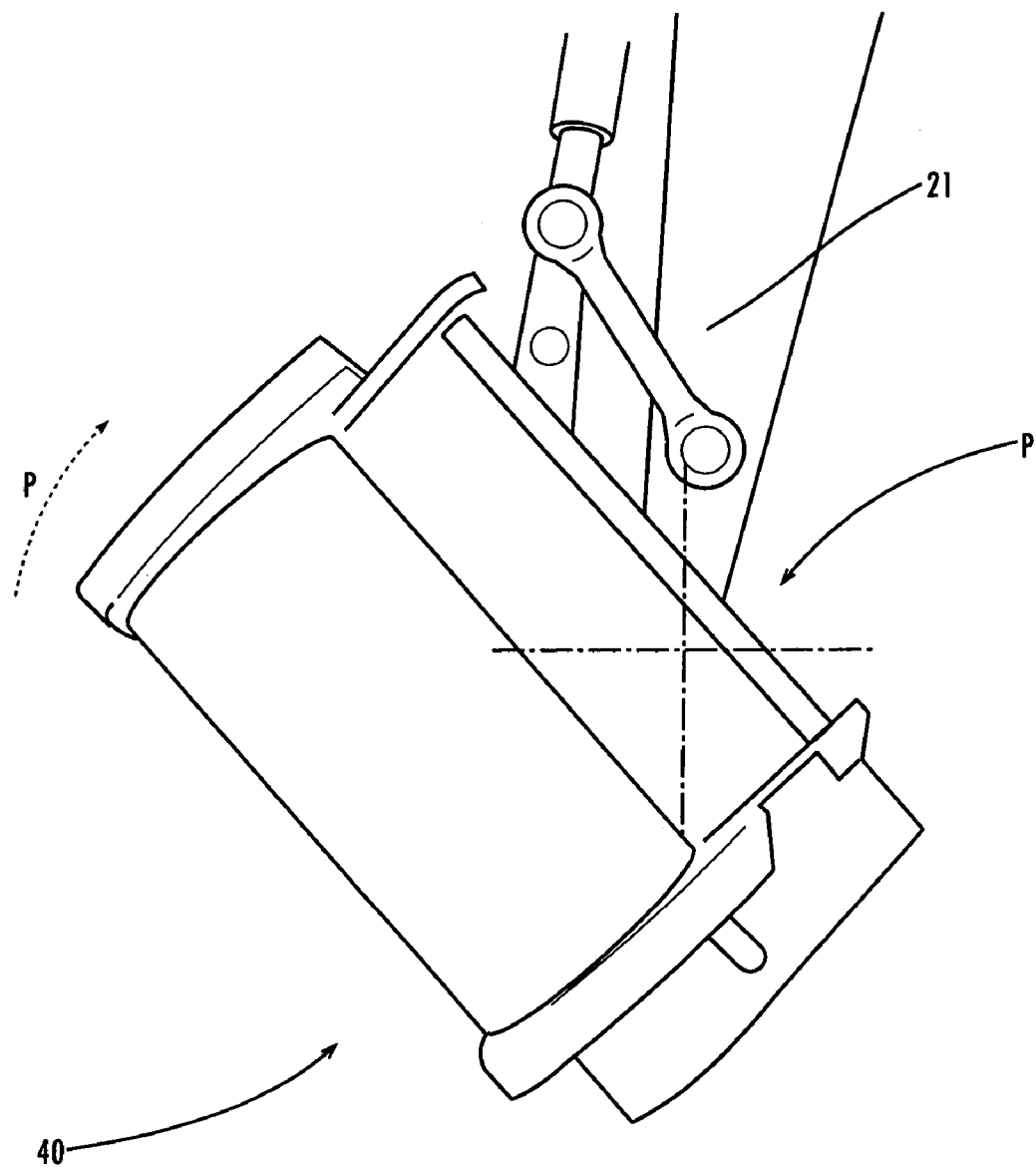

FIG. 11 is another view of the reducing apparatus 40.

Figure 12:
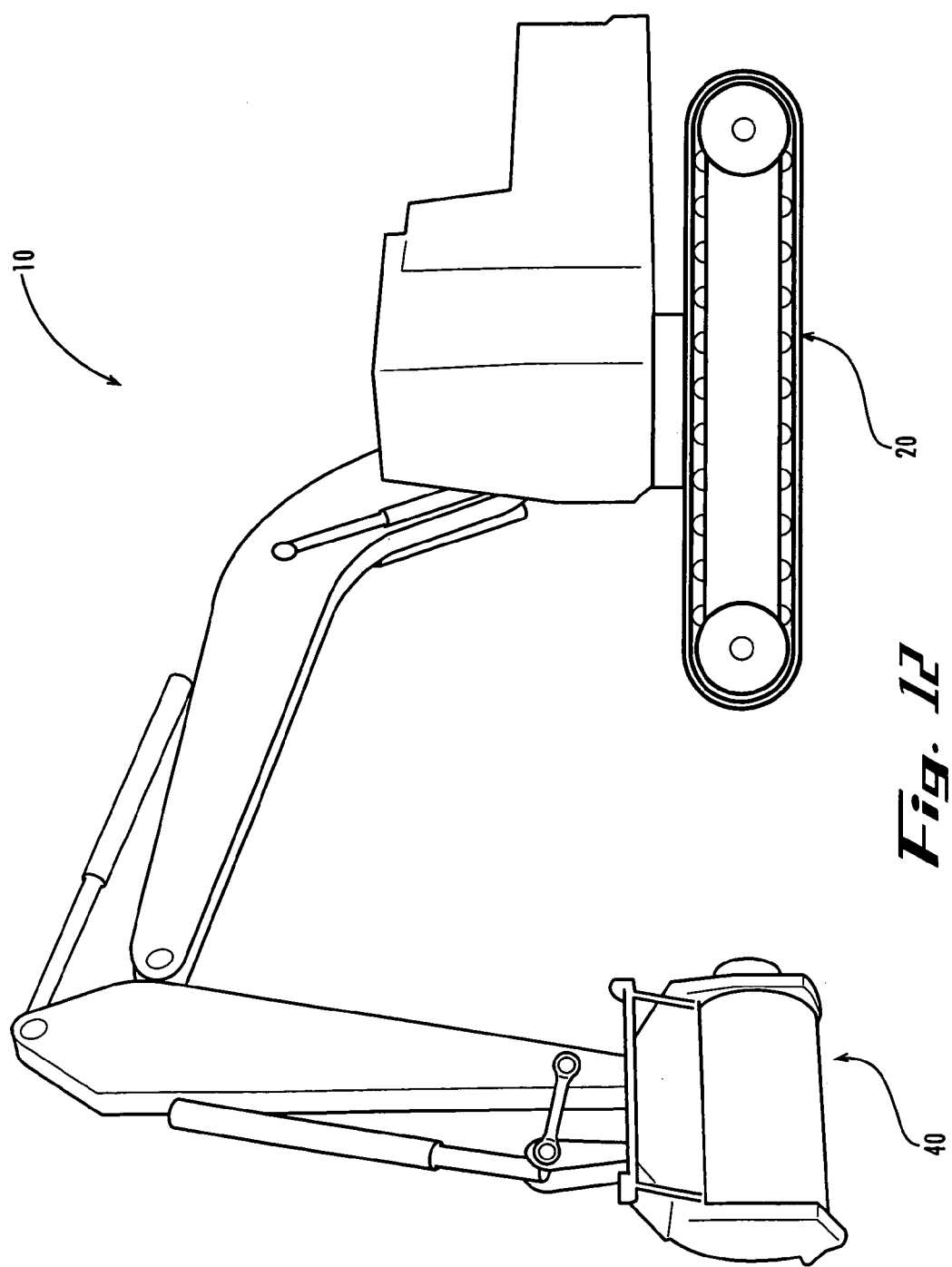
Figure 13:
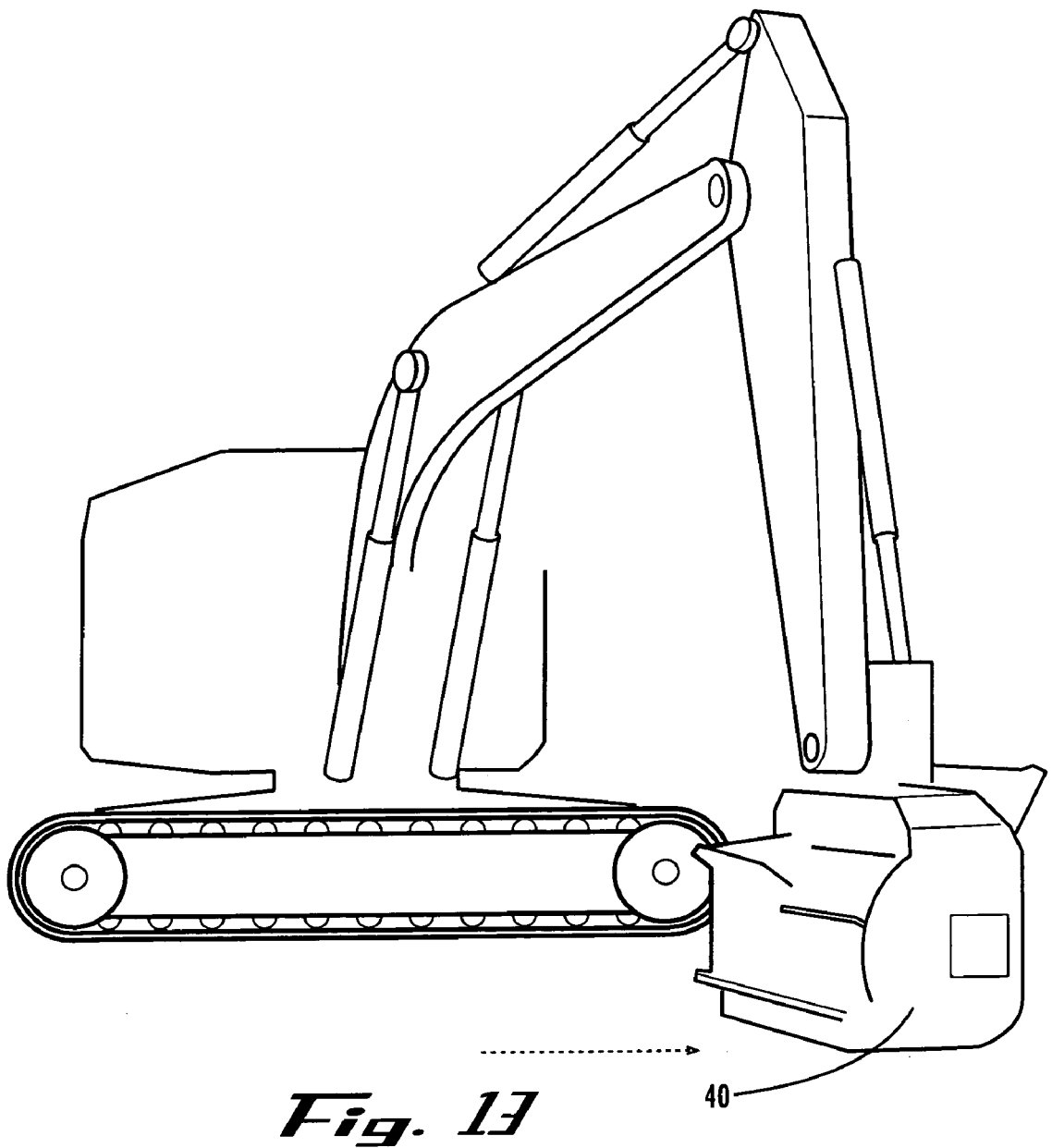

FIGS. 12 and 13 show sequential positions of the excavator 20 with the reducing apparatus 40 mounted thereon, illustrating a "sweeping manner" in which the apparatus may be used from the position shown in FIG. 12 to FIG. 13.

Figure 14:
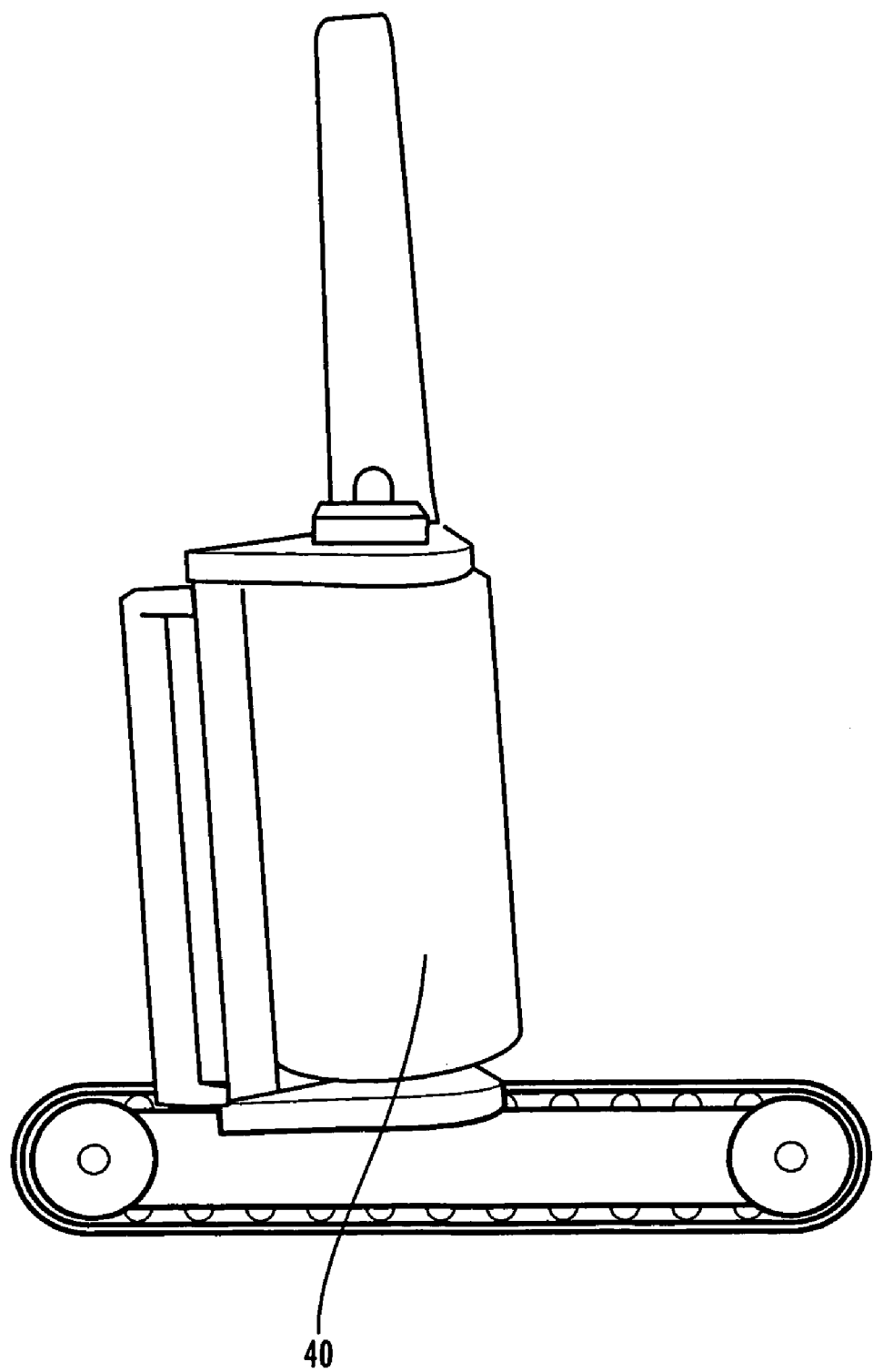

FIG. 14 is a view of the apparatus 20 to the present invention, with the configuration in FIG. 14 showing the drum pivoted such that the main "bottom" surface of the drum is facing away from the cab of the excavator and towards the viewer of the picture. As noted above, this is the only pivoting contemplated under the first embodiment present invention, although a second embodiment contemplates an additional ninety (90) degree pivot, discussed elsewhere.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

General Construction and Operation

Generally described, the invention includes the use of a rotating 'hog', which is attached to the end of an "excavator"

(also known as a track hoe and looks like a very big backhoe). The multi-jointed supporting arm supports at its end the rotating hog providing a reducing function for materials such as trees or other vegetation. This general layout is much like the configuration shown in U.S. Pat. No. 5,992,483.

In summary, the hog, which is essentially a barrel with knives situated thereon, rotates about its longitudinal axis, and consumes trees, etc., as it rotates. The chips, depending on the application, fall on the ground or are otherwise contained.

Details of the operation and construction of the apparatuses according to the present invention are set forth below.

Detailed Construction and Operation

The Overall Apparatus 10

The overall apparatus 10 includes the excavator 20 and the reducing apparatus 40, both of which are discussed below. This apparatus 10 is part of the present invention, as is the reducing apparatus 40 on its own. Two different types of reducing apparatus 40 embodiments will be discussed; the main difference between the two is that the first allows the reducing apparatus 40 to pivot about one axis relative to the supporting excavator, and the second allows the apparatus to pivot about two axes relative to the supporting excavator. These two axes in one embodiment are substantially perpendicular.

The Excavator 20

The excavator 20 is such as known in the art, and includes a first supporting arm 21, a second supporting arm 22, a first hydraulic cylinder 24, a second hydraulic cylinder 25, a pivot link 26, and a floating link 27. The second supporting arm 22 and the floating link 27 attach to and support the reducing apparatus 40.

The excavator 20 includes a separate "power pack" (not shown) which includes a typical separate motor, hydraulic pump, radiator and necessary hose plumbing which connects the power pack's hydraulic pump to the hydraulically driven devices associated with the reducing apparatus 40. As discussed in detail below, these devices include a motor 160 for driving the drum and a linear cylinder 80 for moving the trap door 150.

As may be understood, the first supporting arm 21 of the excavator is pivotably attached relative to the main portion of the excavator, which includes a conventional cab within which an operator (not shown) can operate the overall device. This pivoting action of the arm 21 is provided by a typical hydraulic cylinder such as 21C shown in FIG. 1. The main portion 28 of the excavator 20 is itself rotatably mounted about a vertical a substantially vertical rotation axis relative to a ground-engaging track assembly 29 such as known in the art. This rotational relationship allows for the main portion 28 to rotate approximately 360 degrees relative to the ground (assuming the track assembly is static), which likewise allows for the arms 21, 22 and the reducing apparatus to also be rotated, such that a "sweeping" action can be provided, as described in later detail.

In FIG. 1, it may be understood that the rotating axis RA of the drum 40 is substantially horizontal in the view shown. However, as will be discussed later, the drum can be pivoted (by manipulation of arms 21 and 22 and various hydraulic elements including element 25) such that the rotational axis can be moved to the positions shown as RA' or RA", in which the rotational axis is not horizontal but is inclined relative to the supporting surface 59. This pivoting motion is about an axis along the line of sight of the drawing's viewer, and through point PP, where the second supporting arm 22 is attached to the frame of the apparatus 40.

The arm 21 is pivotably attached as known in the art to arm 22. A first hydraulic cylinder 24 provides the force to facilitate pivoting movement of the arm 22 relative to the arm 21.

The arm 22 is attached to and supports part of the weight of the reducing apparatus via attachment to a mounting flange assembly 51. This mounting flange assembly essentially consists of two planar flanges extending upwardly from the frame of the apparatus and positioned in a spaced-apart manner such that they are substantially parallel. They each include two holes (see P1 and P2 in FIG. 2A) which are lined up so as to allow for the mounting of two elongate, cylindrical mounting pins (not shown) each of which extends into one hole of each of the flanges. The arm 22 is pivotably attached to one of these mounting pins (at location P1 in FIG. 2A) and the floating link 27 is attached to the other mounting pin (at location P2 in FIG. 2A). For purposes of reference, the dotted line DL in FIG. 2B shows the axis along which one of the pins extends, when installed.

The Reducing Apparatus 40

The reducing apparatus 40 according to the present invention is supported at the end of the multi-jointed supporting arm 22 of the excavator 20. The reducing apparatus 40 is an assembly that includes multiple elements and provides the function of reducing wood or other vegetation.

The reducing apparatus 40 includes (but is not limited to) the following components:

40 Reducing Apparatus
    50 Reducing Apparatus Frame Assembly
    51 Mounting Flange Assembly
    60 Ninety (90) Degree Pivoting Connection (in second embodiment)
    70 Reducing Apparatus Cylinder (a.k.a. "drum")
    80 (Linear) Hydraulic Cylinder
    90 Cutting Elements
    110 Containment Surface
    130 First Anvil Plate
    131 Second Anvil plate
    140 Chain Guard Assembly
    150 Trap Door
    160 Hydraulic Motor
    170 Overhung Load Adaptor
    210 Cogged Belt Power Train Assembly
    211 Belt and Pulley Cover
    212 Cogged belt
    214 Cogged belt pulleys
    230 Wire Cutter Knives
    240 Biasing Bracketry
    250 Drum Shaft
    270 Pinion gear (see FIG. 5)

These elements will be discussed in further detail below. It should be understood that alternative elements may be used without departing from the spirit and scope of the present invention.

The Reducing Apparatus Frame 50

The reducing apparatus frame 50 (see FIG. 2A) is configured to be attached to the excavator and to provide support for the various elements of the reducing apparatus. This is done via a mounting flange assembly 51. The mounting points P1 and P2 shown in FIG. 2A are the locations for elongate pins that extend therethrough and allow for pivotable attachment of the flange assembly 51 to the floating link 27 and the second supporting arm 22, respectively.

It should be understood that in the first embodiment, the frame is substantially of one piece. However, in the second embodiment, shown in FIG. 5, the flange assembly 51 is attached to one portion of a pivoting connection (a turntable), and the other portion of the pivoting connection is attached to the main portion of the frame 50. This allows for a ninety degree pivoting feature between the mounting flange assembly 51 and the drum, for example.

The 90 Degree Pivoting Connection 60

The 90 Degree Pivoting Connection 60 is shown only in FIG. 5. This configuration allows for a ninety degree pivoting feature between the mounting flange assembly 51 and the drum 70. This is accomplished by the use of a ring and pinion gear, with the pinion gear being shown as 270 in FIG. 5. The ring gear 270 drives a ring gear or the like to provide rotation of the turntable.

The Reducing Apparatus Cylinder 70

The reducing cylinder 70 (a.k.a. drum 70) is a drum-shaped configuration as known in the art, and is configured to rotate about its longitudinal axis by use of bearings supported by the frame 50 such as known in the art. This drum rotates about its longitudinal axis with a plurality of spaced cutter teeth 90 attached to an exterior of the drum for engaging, grinding and chipping trees, brush and vegetation.

The Cutting Elements 90

A plurality of cutting elements 90 (a.k.a. "cutter teeth 90") are attached to the circumferential surface of the drum 70. Under one preferred embodiment of the invention, these cutting elements 90 are arranged in a plurality of rows spaced apart around the circumference of the drum 70.

According to yet another preferred embodiment of the invention, adjacent ones of the rows are off-set to completely cover the cutting surface of the drum with cutting elements 90.

The cutting elements 90 can be mounted to the drum by conventional means, such that rotation of the drum provides a cutting zone adjacent the circumferential surface of the drum so as to provide a reducing function.

The Containment Surface 110

According to one preferred embodiment of the invention, the containment surface 110 partially enclosing the cutter drum is partially cylindrical and is positioned close to but not contacting the cutting elements 90 at an even spacing around said drum.

The surface 110 is spaced a generally consistent distance from the circumferential surface of the drum and contains two fixed anvil plates 130, 131 for the purpose of deflecting chips back onto the cutting elements 90 for further reduction in chip size.

It should be understood that the containment surface 110 is not completely cylindrical; it makes a 90 degree turn proximate one of the anvil plates. This creates a chipping zone at location 201 (see FIG. 2B). When the trap door is shut down as shown in, for example, FIG. 2B, this creates a pocket in the housing; which can be considered a second chipping zone at 201. Chains hanging down under there help hold the debris inside the shield.

The Anvil Plates 130, 131; The Mulch Zone 200

Two anvil plates 130, 131, are attached to the frame 50 of the apparatus 40. A first anvil plate 130 is positioned at the outer most point of the containment surface 110 extending downward at 90° to a point close to but not contacting cutter knives thereby creating a mulch cutting zone 200. The other anvil plate 131 is located at the other end of the containment surface 110 covering the rotating drum at the bottom most portion of the containment surface 110 where the cutter knives enter the bottom most portion of the containment surface 110.

The anvils have straight working edges, which are spaced approximately ½ inch from the outermost edges of the cutting elements. Said another way, provided is a shield covering a portion of said drum and comprising of a drum-conforming shape and flat end walls attached for containing the deflection of wood chips outwardly from said drum during operation, and the walls of said shield collectively defining an interior surface spaced apart from said cutter teeth and cooperating with said rotating drum to define a debris flow path through the device.

The Trap Door 150

A hydraulically activated trap door 150 is attached at the bottom rear of the containment surface 110 for the purpose of deflecting chips and debris outwardly and to trap debris under for grinding and chipping. This trap door is operated by use of a hydraulically driven cylinder 80, between an up position as shown in FIG. 3B, to a down position as shown in FIG. 3A.

Under one method of operation, the trap door is positioned such that it is open and its edge goes all the way to the ground so when the machine is lowered to the ground, it traps the debris inside the housing inside and helps it mulch it up.

The Hydraulic Motor 160

A hydraulic motor 160 or other suitable drive means is used to drive the drum by the use of belts and pulleys described elsewhere. The hydraulic motor 160 is supplied with pressurized hydraulic fluid by use of a conventional hydraulic pump mounted to the frame of the excavator and which is itself driven by an internal combustion engine mounted at the rear of the excavator.

The Overhung Load Adaptor 170

According to yet another preferred embodiment of the invention, an overhung load adapter 170 is attached as shown in FIGS. 2A, and 4 to the rear of the apparatus 40 for the purpose of transferring power from the hydraulic motor 160 to the main pulley drive.

The hydraulic motor is bolted directly to the overhung load adapter, which consists of big bearings inside with a shaft going through it into the drive pulley.

The Cogged Belt Power Train Assembly 210

According to yet another aspect of the invention, power is transferred from a main pulley 214 (which is attached to the overhung load adaptor) to a secondary pulley 214, which is attached to main shaft of the rotating drum by a cogged belt 212.

According to yet another preferred embodiment of the invention, the main pulley drive and secondary drive pulley are cogged belt pulleys 214 to further increase efficiency and reduce belt slippage.

The Wire Cutter Knives 230

FIG. 7 illustrates an illustrative cutaway portion of the drum 70 having cutter teeth 90 thereon, and supported by a drum shaft 250. As may be seen, the circumferential portion of the drum overhangs somewhat from the substantially round end plate, and wire cutters 230 (only one is shown in the Figure but another is contemplated for use on the opposing side of the drum).

These knives are intended to cut wire which may become entangled with the drum, or at least to trap the wire so that it does not become entangled within the apparatus.

According to one preferred embodiment of the invention, the two wire cutter knives 230 are attached relatively rigidly to or relative to the frame assembly.

Biasing Bracketry 240

The reducing apparatus also includes biasing bracketry 240 (see FIG. 2B), which is part of the present invention, and which can be used by the operator to push up against trees or elongate shrubbery in order to "push it over" and bend it back somewhat so as to allow the drum to engage the vegetation, and such that the vegetation tends to be felled away from the direction of the operator.

It should be understood that the view of FIG. 5 shows the turntable 60 rotated ninety degrees from its "home" position. Such rotation causes the longitudinal axis of the drum 70 to be oriented ninety degrees from its "home" position.

Hydraulics

As noted before, the hydraulics provided to the apparatus 40 are provided in one embodiment by a separate energy source, although such hydraulics could be taken from the excavator if the excavator power was adequate. Such hydraulics provides energy through hydraulics to the drum 70 by hydraulic supply means known in the art to allow the drum 70 to be rotated in either direction. Such hydraulics also provides energy to operate the cylinder.

Operation

The apparatus according to the present invention is operated such that the drum can be manipulated into various positions as needed. In one typical operating condition, the drum is positioned such that its rotational axis is pointed generally at the user (assuming the user is in the operator's cab), and the rotational axis of the drum is substantially horizontal.

However, by operating the first and second arms 21, 22 of the excavator 20, the drum can be moved from the position shown in FIG. 1 such that it's rotational axis is along RA, RA' or RA".

Furthermore, the optional ninety (90) degree pivoting feature allows for the drum to be pivoted such that the axis of the drum is substantially perpendicular to the view of the operator, and such that the exposed portion of the drum is directed substantially away from the operator.

The apparatus may also be understood to be manipulated such that it can chip standing trees "from the top down". As may be understood, by suitable manipulation of the arm of the excavator, the cutting drum may be moved from the top of a tree all the way down, leaving a pile of chips where the tree once stood.

ELEMENTS

10 Overall Apparatus
20 Excavator
21 First Supporting Arm
21C Hydraulic Cylinder
22 Second Supporting Arm
24 First Hydraulic Cylinder
25 Second Hydraulic Cylinder
26 Pivot Link
27 Floating Link
28 Main Portion
29 Track Assembly
40 Reducing Apparatus
50 Reducing Apparatus Frame Assembly
51 Mounting Flange Assembly
60 Ninety (90) Degree Pivoting Connection (second embodiment only)
70 Reducing Apparatus Cylinder (a.k.a. "drum")
80 Hydraulic Cylinder
90 Cutting Elements
110 Containment Surface
130 First Anvil Plate
131 Second Anvil plate
140 Chain Guard Assembly
150 Trap Door
160 Hydraulic Motor
170 Overhung Load Adaptor
200 First Mulch Zone
201 Second Mulch Zone
210 Cogged Belt Power Train Assembly
211 Belt and Pulley Cover
212 Cogged belt
214 Cogged belt pulleys
230 Wire Cutter Knives
240 Biasing Bracketry
250 Drum Shaft
260 Bearing;
270 Pinion Gear

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A reducing device to be attached to the free end of a movable working arm of a self-propelled machine for reducing trees, brush and vegetation into smaller chips, said self propelled device configured for being propelled across a ground surface, said reducing device comprising:
   (A) a frame assembly including a frame pivoting feature between said frame assembly and said working arm of said self-propelled machine, said pivoting being about a frame pivoting axis and being through a range of at least 90 degrees about said frame pivoting axis;
   (B) a drum including a substantially continuous outwardly facing circumferential surface relative to a central longitudinal axis, said drum being rotatably mounted relative to said frame assembly about a rotational axis being substantially common to said central longitudinal axis, said rotational axis of said drum being substantially perpendicular to said frame pivoting axis;
   (C) a plurality of spaced apart cutting elements attached to said drum, said cutting elements configured for reducing trees, brush and vegetation into smaller chips, said cutting elements extending above said circumferential surface a first nominal cutting distance;
   (D) a containment member operably attached to said frame assembly and defining a containment surface spaced relative to said circumferential surface of said drum so as to define a first mulch zone between said containment surface and said circumferential surface of said drum, said containment member including first and second anvil plates, said containment surface including three surface portions, including:
   1) a substantially semicircumferencial surface portion facing said circumferential surface of said drum, said substantially semicircumferencial surface portion positioned close to but not contacting said cutting elements and at a second spacing relative to said circumferential surface of said drum, said second spacing being greater than said first nominal cutting distance referenced in element "C";
   2) a first anvil plate surface portion defined by said first anvil plate, said first anvil plate surface portion extending from one edge of said semicircumferencial surface portion towards said drum, said first anvil plate surface portion configured to tend to retain a first portion of said said chips within said first mulch zone as said cutting elements pass through said first mulch zone, thus further reducing them; and 3) a second anvil plate surface portion defined by said second anvil plate, said second anvil plate surface portion extending from another edge of said semicircumferencial surface portion towards said drum, said second anvil plate surface portion configured to tend to retain said first portion of said chips within said first mulch zone as said cutting elements pass through said first mulch zone, thus further reducing them;

(E) a pivoting trap door member pivotably attached to said frame assembly and configured to be moved between two positions, an "up" position and a "down" position, wherein in said "down" position said trap door is configured to include a free end which can be positioned atop said ground surface such that a second mulch zone is least partially defined by said pivoting trap door member, said circumferential surface of said drum, and said ground surface, and such that rotation of said drum causes said plurality of spaced apart cutting elements to pass through said first and second mulch zones such that as said cutting elements pass through said first mulch zone said first portion of said chips tend to be retained within said first mulch zone by said first and second anvil plates, thus further reducing said chips; and such that rotation of said drum while said pivoting trap door member is moved into said down position causes said second portion of said chips to be retained within said second mulch zone at least in part by cooperation of said pivoting trap door member, said circumferential surface of said drum, and said ground surface.

2. A reducing device according to claim 1, wherein said first anvil plate is positioned proximate the location said cutting elements exit said mulch zone.

3. A reducing device according to claim 2, wherein said second anvil plate is positioned proximate the location said cutting elements enter said mulch zone.

4. A reducing device according to claim 1, wherein said second anvil plate is positioned proximate the location said cutting elements enter said mulch zone.

5. A cutter device according to claim 1, further comprising a hydraulic motor configured to drive said rotating drum.

6. A reducing device according to claim 5, wherein said first anvil plate is positioned proximate the location said cutting elements exit said mulch zone.

7. A reducing device according to claim 6, wherein said second anvil plate is positioned proximate the location said cutting elements enter said mulch zone.

8. A reducing device according to claim 5, wherein said second anvil plate is positioned proximate the location said cutting elements enter said mulch zone.

9. A reducing device according to claim 1, wherein said pivoting trap door member is pivotably mounted about a pivot axis substantially parallel to said rotational axis of said drum.

* * * * *